US007206051B2

(12) United States Patent
Lee et al.

(10) Patent No.: US 7,206,051 B2
(45) Date of Patent: Apr. 17, 2007

(54) IN-PLANE SWITCHING MODE LIQUID CRYSTAL DISPLAY DEVICE

(75) Inventors: Seung-Chul Lee, Gyeonggi-Do (KR); Ki-Bok Park, Gyeonggi-Do (KR); Won-Ho Lee, Gyeonggi-Do (KR)

(73) Assignee: LG.Philips LCD Co., Ltd, Youngdungapo-ku, Seoul (KR)

( * ) Notice: Subject to any disclaimer, the term of this patent is extended or adjusted under 35 U.S.C. 154(b) by 226 days.

(21) Appl. No.: 10/939,452

(22) Filed: Sep. 14, 2004

(65) Prior Publication Data

US 2005/0083467 A1    Apr. 21, 2005

(30) Foreign Application Priority Data

Sep. 15, 2003    (KR) ...................... 10-2003-0063784

(51) Int. Cl.
*G02F 1/1333*    (2006.01)

(52) U.S. Cl. ..................................... 349/141

(58) Field of Classification Search ................. 349/141
See application file for complete search history.

(56) References Cited

U.S. PATENT DOCUMENTS 6,088,078 A       7/2000   Kim et al.
6,452,657 B1 *    9/2002   Suzuki et al. ................ 349/141

* cited by examiner

*Primary Examiner*—James A. Dudek
(74) *Attorney, Agent, or Firm*—McKenna Long & Aldridge LLP

(57) ABSTRACT

An in-plane switching mode LCD device includes a first substrate, a gate line and a data arranged perpendicularly on the first substrate to define a pixel region, a pixel electrode module overlapping the common electrode module in the pixel region. The common electrode module includes a plurality of common electrodes arranged parallel to the gate line. The pixel electrode module includes a plurality of pixel electrodes arranged parallel to the one or more data line, and an upper pixel electrode auxiliary line disposed at an upper end of the pixel region and connecting the pixel electrodes, the plurality of pixel electrodes crossing the plurality of common electrodes to define a plurality of sub-pixel regions.

30 Claims, 11 Drawing Sheets

IN-PLANE SWITCHING MODE LIQUID CRYSTAL DISPLAY DEVICE

The present invention claims the benefit of Korean Patent Application No. P2003-63784 filed in Korea on Sep. 15, 2003, which is hereby incorporated by reference.

BACKGROUND OF THE INVENTION

1. Field of the Invention

The present invention relates to a liquid crystal display device and, more particularly, to an in-plane switching mode liquid crystal display device.

2. Description of the Related Art

Liquid crystal display devices are typically used because they consume low power and provide high picture quality. A liquid crystal display device is formed by attaching face to face a thin film transistor array substrate and a color filter substrate with a uniform interval therebetween, and disposing a liquid crystal layer between the thin film transistor array substrate and the color filter substrate.

Pixels are arranged on the thin film transistor array substrate in a matrix arrangement. A thin film transistor, a pixel electrode and a capacitor are formed within a pixel. A common electrode, an RGB color filter and a black matrix are formed on the color filter substrate. The common electrode applies an electric field to the liquid crystal layer together with the pixel electrode. The RGB color filter provides color display capabilities. An alignment film is formed at facing surfaces of the thin film transistor array substrate and the color filter substrate and is rubbed to orient the liquid crystal layer in a specified direction.

When an electric field is applied between the pixel electrode and the common electrodes, the liquid crystal rotates due to a dielectric anisotropy. As a result, light is transmitted or blocked by pixels to display a character or an image. However, such a twisted nematic mode liquid crystal display device has a narrow viewing angle. In-plane switching mode LCD arrangements have been recently introduced to improve the narrow viewing angle by aligning liquid crystal molecules in an almost horizontal direction with respect to the substrate.

FIG. 1A depicts a plan view of an in-plane switching mode liquid crystal display (LCD) device in accordance with a related art arrangement. FIG. 1B illustrates a sectional view of an in-plane switching mode liquid crystal display (LCD) device in accordance with a related art arrangement. As shown in FIG. 1A, gate lines 1 and data lines 3 are arranged horizontally and vertically on a first transparent substrate 10, defining pixel regions. Although in an actual liquid crystal display device, the 'N' number of gate lines I and the 'M' number of data lines 3 cross each other to create an N×M number of pixels. Only one pixel is shown in FIG. 1A for explanatory purposes.

A thin film transistor 9 is disposed at a crossing of the gate line 1 and the data line 3. The thin film transistor 9 includes a gate electrode 1a, a semiconductor layer 5 and source/drain electrodes 2a and 2b. The gate electrode 1a is connected to the gate line 1. The source/drain electrodes 2a and 2b are connected to the data line 3. A gate insulation layer 8 is formed on the entire substrate.

A common line 4 is arranged parallel to the gate line 1 in the pixel region. A pair of electrodes, which are a common electrode 6 and a pixel electrode 7, are arranged parallel to the data line 3 for switching liquid crystal molecules. The common electrode 6 is simultaneously formed with the gate line 1 and connected to the common line 4. The pixel electrode 7 is simultaneously formed with the source/drain electrodes 2a and 2b and connected to the drain electrode 2b of the thin film transistor 9. A passivation film 11 is formed on the entire surface of the substrate 10 including the source/drain electrodes 2a and 2b. A pixel electrode line 14 is formed to overlap the common line 4 and is connected to the pixel electrode 7. The pixel electrode line 14, the common line 4, and the gate insulation layer 8 interposed therebetween, form a storage capacitor (Cst).

A black matrix 21 and a color filter 23 are formed on a second substrate 20, on which an overcoat film is formed for flattening the color filter 23. The black matrix 21 prevents light leakage to the thin film transistor 9, the gate line 1 and the data line 3. The color filter 23 provides color display capabilities to the liquid crystal display device. Alignment films 12a and 12b are formed at facing surfaces of the first and second substrates 10 and 20. The alignment films 12a and 12b determine an initial alignment direction of the liquid crystal. A liquid crystal layer 13 is formed between the first and second substrates 10 and 20. The light transmittance of the liquid crystal layer 13 is controlled by a voltage applied between the common electrode 6 and the pixel electrode 7.

FIG. 2A illustrates the orientation of a liquid crystal molecule in accordance with the related art in-plane switching mode LCD device when no voltage is applied to the LCD device. Referring to FIG. 2A, when no voltage is applied between the common electrode 6 and the pixel electrode 7 of the in-plane switching mode LCD device, a liquid crystal molecule in the liquid crystal layer is arranged along a rubbing direction (the direction indicated by arrow ↑ in the drawing) of the alignment film formed at the facing surfaces of the first and second substrates.

FIG. 2B illustrates the orientation of a liquid crystal molecule in accordance with the related art in-plane switching mode LCD device when a voltage is applied to the LCD device. Referring to FIG. 2B, when a voltage is applied between the common electrode 6 and the pixel electrode 7, an electric field is generated between electrodes 6 and 7, and the liquid crystal molecule transmits light according to the generated electric field.

FIG. 3 is a graph showing variations of the light transmittance characteristics of the related art in-plane switching mode LCD device. As shown in FIG. 3, the light transmittance increases linearly with the voltage applied between the common electrode 6 and the pixel electrode 7. However, if the voltage increases continuously beyond a maximum value, the light transmittance starts to decrease in a parabolic shape. In this case, the voltage Vmax corresponding to a maximum transmittance is obtained when the liquid crystal molecule makes a 45° angle with respect to the initial alignment direction of the alignment film. Moreover, the transmittance of the liquid crystal material is reduced if a voltage higher than Vmax is applied between the common electrode 6 and the pixel electrode 7.

However, the graph in FIG. 3 only depicts a theoretical transmittance. In an actual related art LCD device, the maximum luminance is reached at a voltage lower than the theoretical value Vmax. Thus, luminance is degraded by the application of the theoretical value Vmax to an actual product. Thus, in an actual related art LCD device, the maximum value of the applied voltage is set lower than the theoretical Vmax. Accordingly, maximum luminance of the product cannot generally be reached.

The in-plane switching mode LCD device suffers from the following problems. Liquid crystal molecules in the liquid crystal layer 13 are always oriented on the same plane, thus reducing a grey level in the vertical and horizontal viewing angle direction. Although the viewing angle can be enhanced, the transmittance at a voltage higher than Vmax is degraded. In addition, although a voltage Vmax needs be applied to achieve the brightest possible image, picture quality is impacted by the collective arrangement of liquid crystal molecules in one direction. For example, a yellow shift appears when a screen image is viewed in the direction of the shorter side of the liquid crystal molecules. A blue shift occurs when the screen image is viewed in the direction of the longer side of the liquid crystal molecules.

SUMMARY OF THE INVENTION

Accordingly, the present invention is directed to an in-plane switching mode liquid crystal display device that substantially obviates one or more of the problems due to limitations and disadvantages of the related art.

An object of the present invention is to provide an in-plane switching mode liquid crystal display (LCD) device with improved transmittance at high voltages.

Another object of the present invention is to provide a method of fabricating an in-plane switching mode liquid crystal display (LCD) device with improved transmittance at high voltages.

Another object of the present invention is to provide an in-plane switching mode liquid crystal display (LCD) device with reduced color shift in relation to a viewing angle.

Another object of the present invention is to provide a method of fabricating an in-plane switching mode liquid crystal display (LCD) device with reduced color shift in relation to a viewing angle.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the in-plane switching mode LCD device includes a first substrate; one or more gate line arranged in a first direction on the first substrate; one or more data line arranged in a second direction perpendicular to the first direction on the first substrate, a crossing of the one or more data line with the one or more gate line defining a pixel region; a common electrode module disposed in the pixel region; a pixel electrode module disposed in the pixel region, overlapping the common electrode module; a second substrate facing the first substrate; a first alignment film and a second alignment film disposed at facing surfaces of the first and second substrates, respectively; and a liquid crystal layer between the first alignment film and the second alignment film. The common electrode module includes a plurality of common electrodes arranged parallel to the one or more gate line, a left common electrode auxiliary line disposed at an outer left edge of the pixel region, and a right common electrode auxiliary line disposed at an outer right edge of the pixel region, the left and the right common electrode auxiliary lines connecting the plurality of common electrodes. The pixel electrode module includes a plurality of pixel electrodes arranged parallel to the one or more data line, and an upper pixel electrode auxiliary line disposed at an upper end of the pixel region and connecting the pixel electrodes, the plurality of pixel electrodes crossing the plurality of common electrodes to define a plurality of sub-pixel regions.

In another aspect, the in-plane switching mode LCD device includes a first substrate; one or more gate line arranged horizontally on the first substrate; one or more data line arranged vertically on the first substrate, and a crossing of the one or more data line with the one or more gate line defining a pixel region; a common electrode module disposed in the pixel region; a pixel electrode module disposed in the pixel region, overlapping the common electrode module; a second substrate facing the first substrate; a first alignment film and a second alignment film disposed at facing surfaces of the first and second substrates, respectively; and a liquid crystal layer between the first alignment film and the second alignment film. The common electrode module includes a plurality of common electrodes arranged parallel to the one or more gate line, a left common electrode auxiliary line disposed at an outer left edge of the pixel region, and a right common electrode auxiliary line disposed at an outer right edge of the pixel region, the left and the right common electrode auxiliary lines connecting the plurality of common electrodes. The pixel electrode module includes a plurality of pixel electrodes arranged parallel to the one or more data line, an upper pixel electrode auxiliary line disposed at an upper end of the pixel region, a lower pixel electrode auxiliary line disposed at a lower end of the pixel region, each of the upper and lower pixel electrode auxiliary lines connecting respective upper and lower ends of the plurality of pixel electrodes, the plurality of pixel electrodes crossing the plurality of common electrodes to define a plurality of sub-pixel regions.

In another aspect, the method for fabricating an in-plane switching mode LCD device includes providing a first substrate and a second substrate facing each other; forming one or more horizontal gate line on the first substrate; forming one or more vertical data line on the first substrate, a crossing of the one or more data line with the one or more gate line defining a pixel region; forming a common electrode module disposed in the pixel region by forming a plurality of common electrodes arranged parallel to the one or more gate line, disposing a left common electrode auxiliary line at an outer left edge of the pixel region, and disposing a right common electrode auxiliary line at an outer right edge of the pixel region, the left and the right common electrode auxiliary lines connecting the plurality of common electrodes; forming a pixel electrode module disposed in the pixel region, overlapping the common electrode module by forming a plurality of pixel electrodes arranged parallel to the one or more data line, disposing an upper pixel electrode auxiliary line at an upper end of the pixel region, disposing a lower pixel electrode auxiliary line at a lower end of the pixel region, each of the upper and lower pixel electrode auxiliary lines connecting respective upper and lower ends of the plurality of pixel electrodes, the plurality of pixel electrodes crossing the plurality of common electrodes to define a plurality of sub-pixel regions; forming a first alignment film and a second alignment film at facing surfaces of the first and second substrates, respectively; and forming a liquid crystal layer between the first alignment film and the second alignment film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 4A:
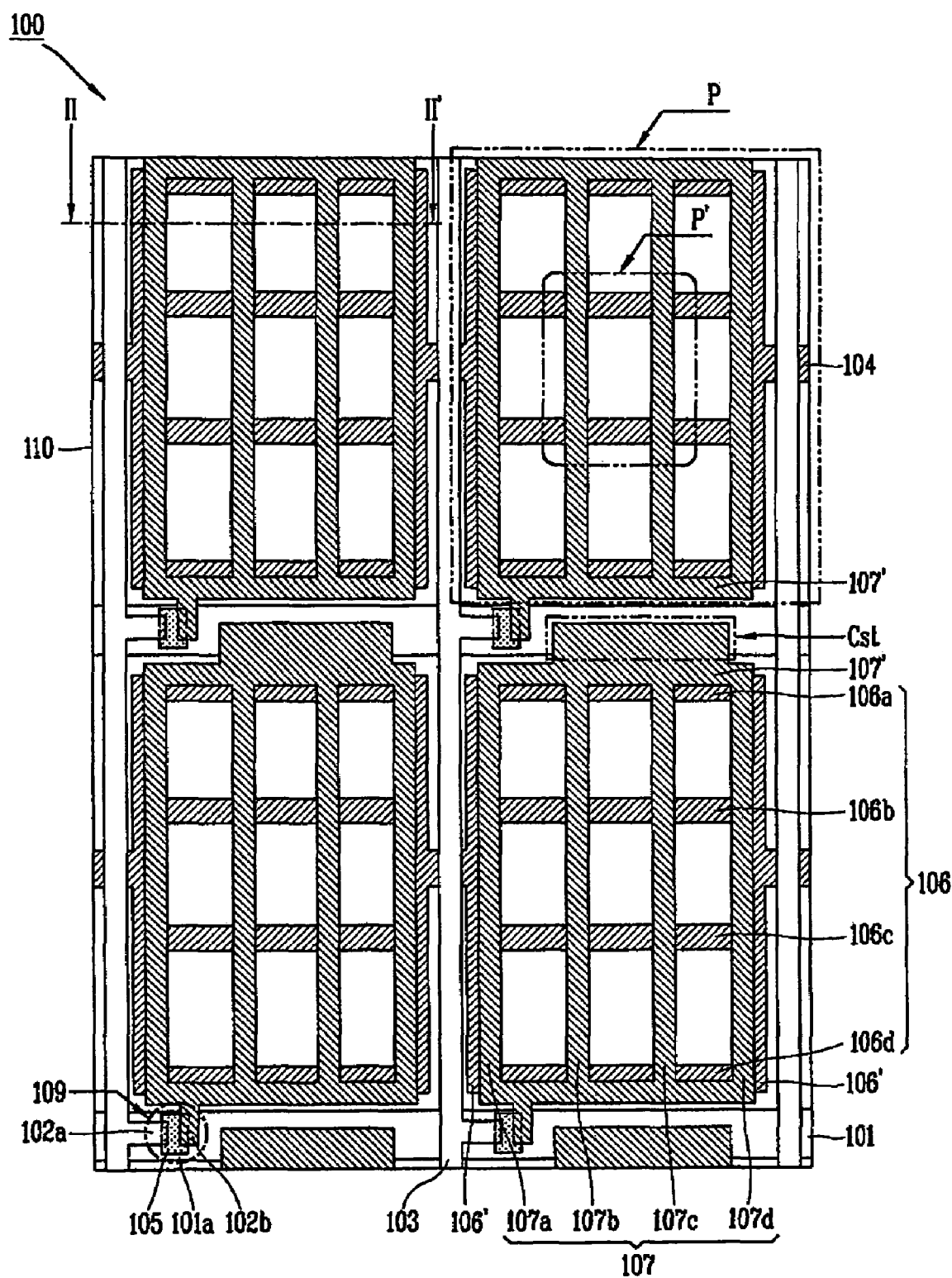
FIG. 4A depicts a plan view of an exemplary in-plane switching mode liquid crystal display (LCD) device in accordance with an embodiment of the present invention.

FIG. 4A depicts a plan view of an exemplary in-plane switching mode liquid crystal display (LCD) device in accordance with an embodiment of the present invention.

Referring to FIG. 4A, the in-plane switching mode LCD device 100 includes gate lines 101 and data lines 103. The gate lines 101 and the data lines 103 are arranged on a transparent first substrate 110 horizontally and vertically, respectively. A crossing of a gate line 101 and a data line 103 defines a pixel (P). A switching device 109 is disposed at a crossing of a gate line 101 and a data line 103. The switching device 109 includes a gate electrode 101a, a semiconductor layer 105 and source/drain electrodes 102a and 102b. The gate electrode 101a extends from the gate line 101. The semiconductor layer 105 is formed on the gate electrode 101a. The source/drain electrodes 102a and 102b are disposed on the semiconductor layer 105 with an interval therebetween.

The pixel (P) is divided into a plurality of sub-pixels (P') by a first electrode module 106 and second electrode module 107 arranged horizontally and vertically, respectively, in the pixel region (P). The first electrode module 106, which is a common electrode module, includes first to fourth common electrodes 106a–106d. The second electrode module 107, which is a pixel electrode module, includes first to fourth pixel electrodes 107a–107d. The first to fourth common electrodes 106a–106d are arranged parallel to the gate line 101. The first to fourth pixel electrodes 107a–107d are arranged parallel to the data line 103. Crossings of the first to fourth common electrodes with the first to fourth pixel electrodes form a plurality of sub-pixels (P'). Though not shown, the first electrode module 106 can be formed parallel to the data line 103 and the second electrode module 107 can be formed parallel to the gate line 101.

A common electrode auxiliary line 106' is formed parallel to the data line 103 at an outer edge of the pixel (P) and overlapped by the first and fourth pixel electrodes 107a, 107d. The common electrode auxiliary line 106' electrically connects the first to fourth common electrodes 106a–106d. The common electrode auxiliary line 106' does not generate an electric field for driving the liquid crystal in the sub-pixels (P') but shields the first to fourth pixel electrodes 107a–107d from the influence of signals on the data line 103. Preferably, the common electrode auxiliary line 106' is disposed closer to the data line 103 than to the first to fourth pixel electrodes 107a–107d, to provide a more effective shield against signals carried on the data line 103.

Still referring to FIG. 4A, a common electrode connection pattern 104 is formed to electrically connect neighboring common electrode auxiliary lines 106'. The common electrode connection pattern 104 can be formed at any position of the common electrode auxiliary line 106'. The common electrode connection pattern 104 preferably formed at the central portion of the common electrode auxiliary line 106' to raise a speed of transferring a signal to the common electrode module 106.

A pixel electrode auxiliary line 107' is formed at an outer edge of the pixel (P). The pixel electrode auxiliary line 107' is parallel to the gate line 101. The pixel electrode auxiliary line 107' electrically connects the first to fourth pixel electrodes 107a–107d. An upper pixel electrode auxiliary line 107' is positioned at an upper end of the pixel electrodes 107a–107d. The upper pixel electrode auxiliary line 107' and an overlapped portion of the gate line 101 at an upper end of the pixel form a storage capacitor (Cst). A lower pixel electrode auxiliary line 107' is positioned at a lower end of the pixel electrodes 107a–107d. The lower pixel electrode auxiliary line 107' is electrically connected to the drain electrode 102b of the switching device 109.

The first to fourth common electrodes 106a–106d and the pixel electrode auxiliary line 107' or the first to fourth pixel electrodes 107a–107d and the common electrode auxiliary line 106' can form a different storage capacitor by overlapping with each other at a certain interval. A storage capacitor can be formed at a region where the common electrode module 106 and the pixel electrode module 107 cross and overlap each other. Accordingly, the capacitance of the storage capacitor can be increased.

Figure 4B:
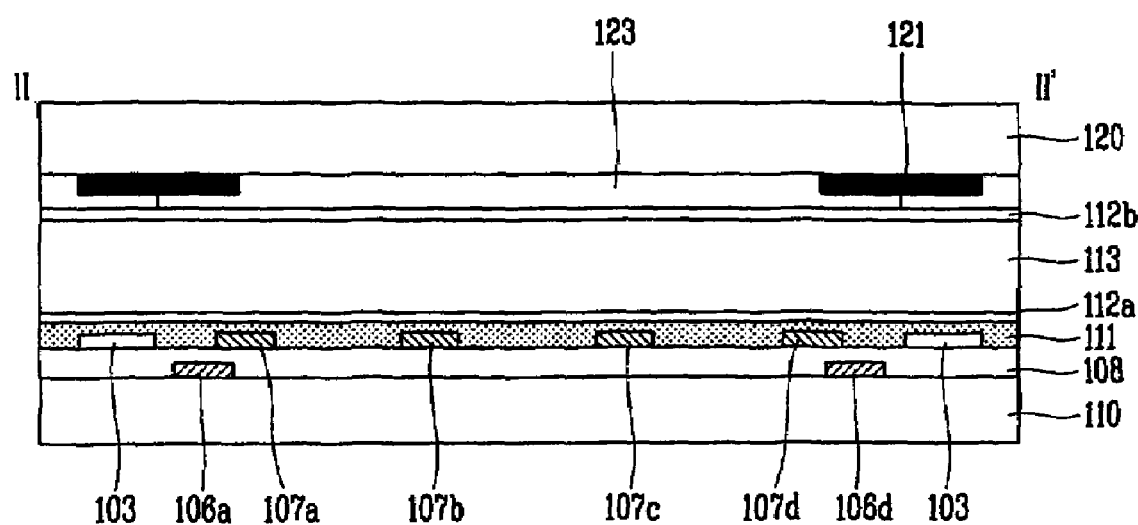
FIG. 4B illustrates a sectional view of an exemplary in-plane switching mode liquid crystal display (LCD) device in accordance with an embodiment of the present invention.

FIG. 4B illustrates a sectional view of an exemplary in-plane switching mode liquid crystal display (LCD) device in accordance with an embodiment of the present invention. Referring to FIG. 4B, the common electrode module 106 and the pixel electrode module 107 are electrically insulated by a gate insulation layer 108 interposed therebetween. A passivation film 111 is formed on an entire surface of the substrate including the pixel electrode module 107.

A black matrix 121 and a color filter 123 are formed on the second substrate 120. The black matrix 121 prevents leakage of light from the liquid crystal display. The color filter 123 implements color for the liquid crystal display. First and second alignment films 112a and 112b are formed at facing surfaces of the first and second substrates 110 and 120. The first and second alignment films 112a and 112b determine an initial alignment direction of liquid crystal. A liquid crystal layer 113 is interposed between the first and second alignment films 112a and 112b.

Figure 5A:
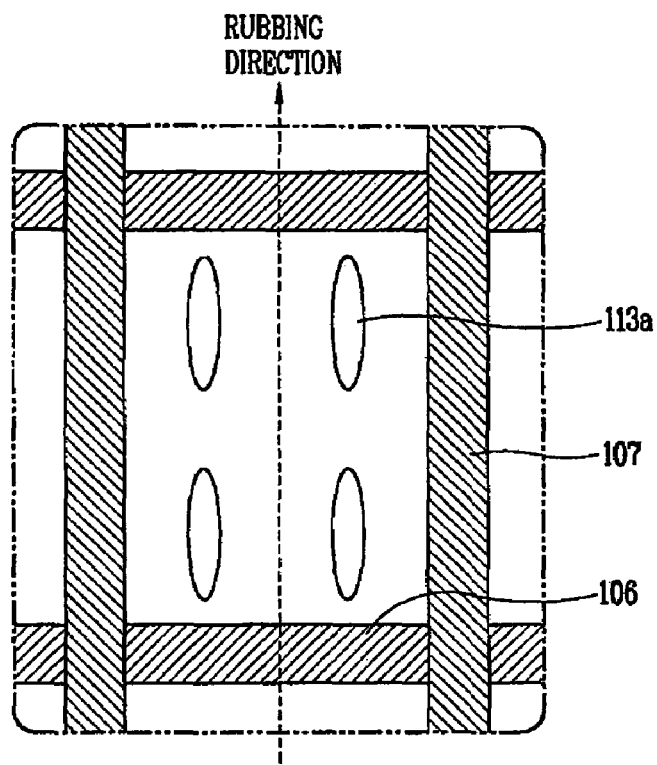
FIG. 5A illustrates the orientation of liquid crystal molecules when no voltage is applied to an exemplary in-plane switching mode liquid crystal display (LCD) device in accordance with an embodiment of the present invention.

In an in-plane switching mode LCD device according to embodiments of the present invention, light transmittance is controlled by driving liquid crystal molecules in accordance with the strength of a voltage applied between the common electrode module 106 and the pixel electrode module 107. FIG. 5A illustrates the orientation of liquid crystal molecules when no voltage is applied to an exemplary in-plane switching mode liquid crystal display (LCD) device in accordance with an embodiment of the present invention. Referring to FIG. 5A, when no voltage is applied between the common electrode module 106 and the pixel electrode module 107, the liquid crystal molecules 113a are oriented in the rubbing direction (the direction indicated by arrow ↑) of the alignment film formed at the facing surfaces of the first and second substrates 110 and 120. As depicted in FIG. 5A, the rubbing direction of the alignment film is parallel to the direction of the pixel electrode module 107. In this case, the liquid crystal molecules 113a are oriented parallel to the direction of the pixel electrode module 107, thereby displaying black on the screen. Alternatively, the rubbing direction can be parallel to the direction of the common electrode module 106. In this alternate case, the liquid crystal is oriented parallel to the direction of the common electrode module 106.

Figure 5B:
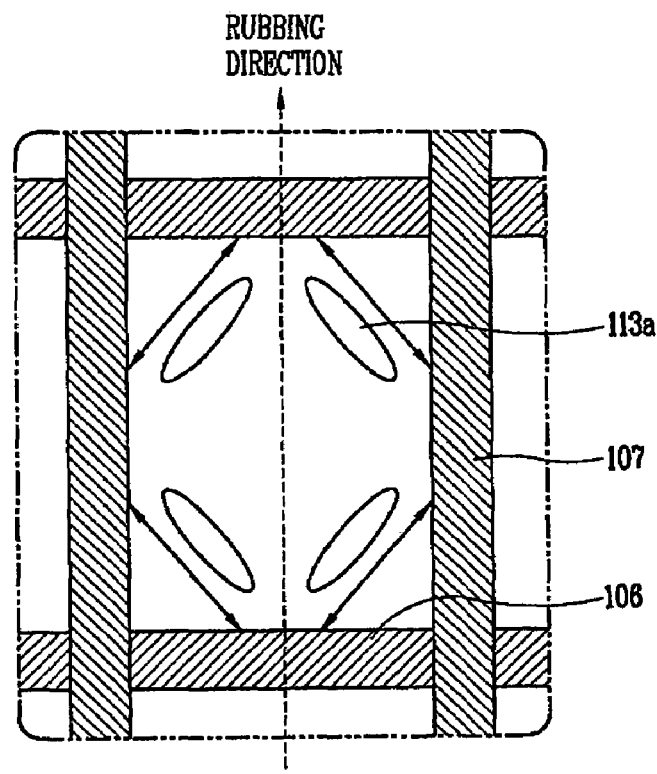
FIG. 5B illustrates the orientation of liquid crystal molecules when a voltage is applied to an exemplary in-plane switching mode liquid crystal display (LCD) device in accordance with an embodiment of the present invention.

FIG. 5B illustrates the orientation of liquid crystal molecules when a voltage is applied to an exemplary in-plane switching mode liquid crystal display (LCD) device in accordance with an embodiment of the present invention. Referring to FIG. 5B, when a voltage is applied between the common electrode module 106 and the pixel electrode module 107, an electric field is generated therebetween. The liquid crystal molecules 113a are driven by the electric field generated by the voltage applied between the common electrode and the pixel electrode. As discussed above, the common electrode module 106 crosses perpendicularly the pixel electrode module 107 to form the sub-pixel P'. When the voltage is applied across the common electrode module 106 and the pixel electrode module 107, the electric field generated in the sub-pixel P' is diagonally oriented at corner portions of the sub-pixel P' and is symmetrical about the center of the sub-pixel P', as depicted in FIG. 5B.

Figure 1A:
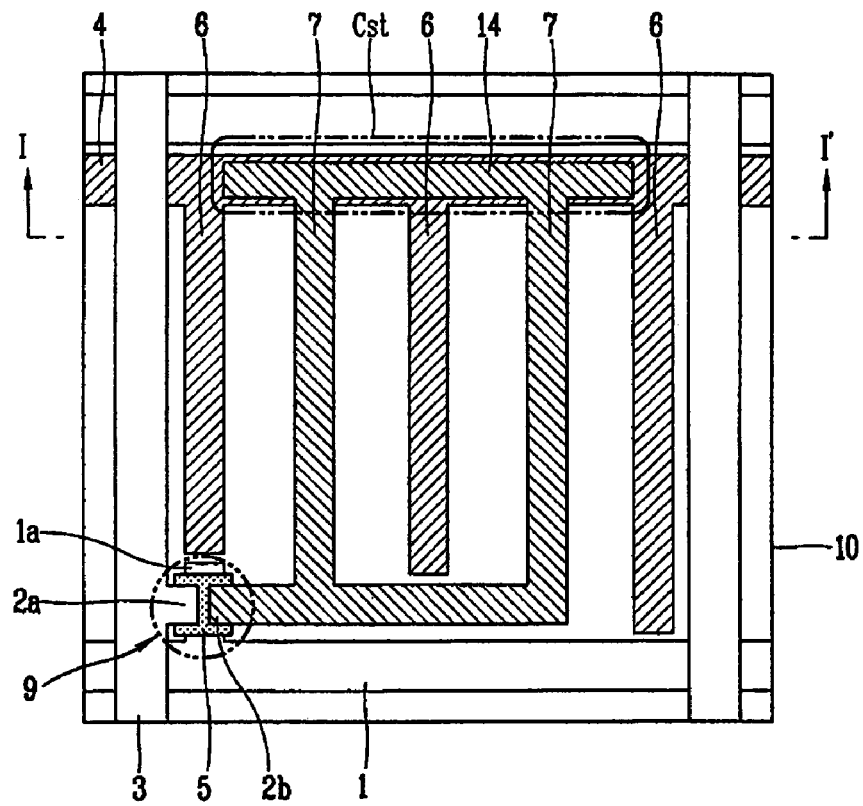
FIG. 1A depicts a plan view of an in-plane switching mode liquid crystal display (LCD) device in accordance with a related art arrangement.
Figure 1B:
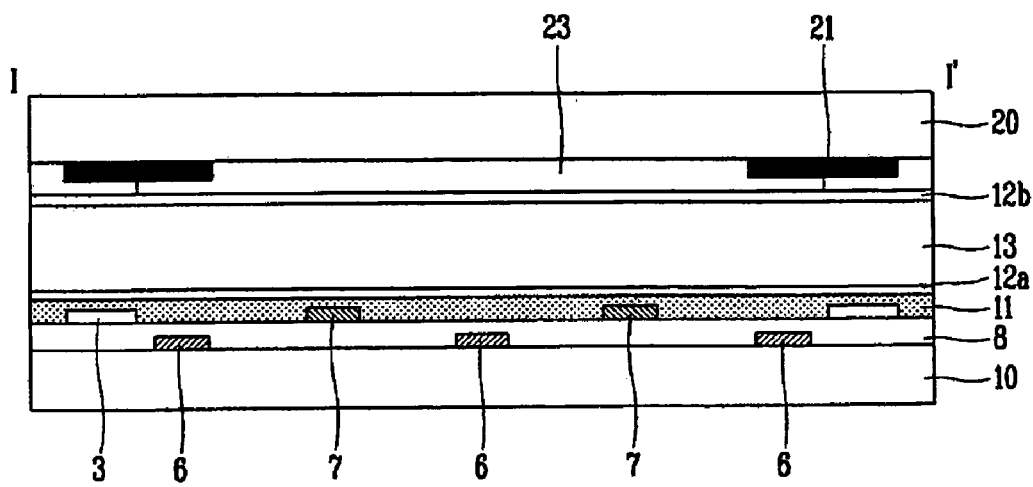
FIG. 1B illustrates a sectional view of an in-plane switching mode liquid crystal display (LCD) device in accordance with a related art arrangement.
Figure 2A:
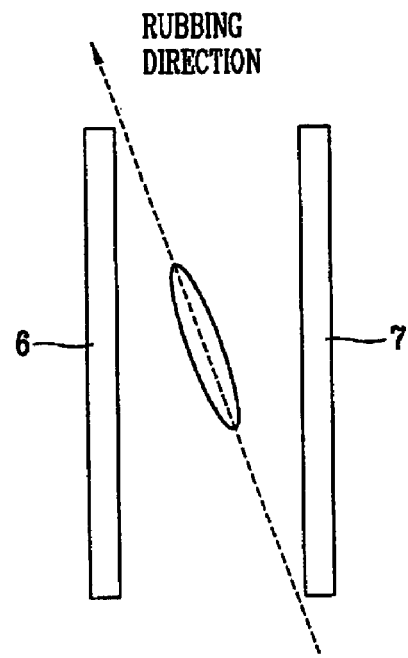
FIG. 2A illustrates the orientation of a liquid crystal molecule in accordance with the related art in-plane switching mode LCD device when no voltage is applied to the LCD device.
Figure 2B:
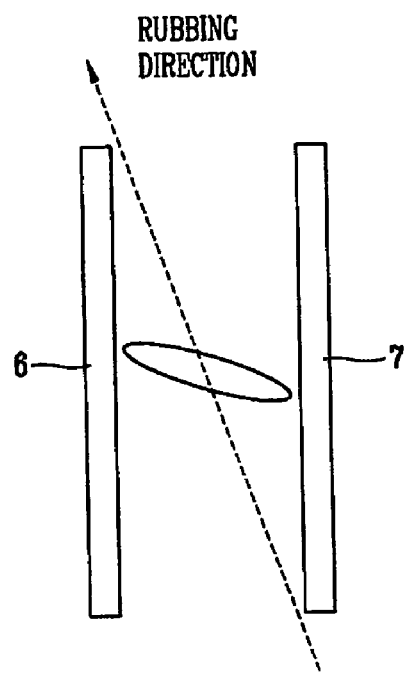
FIG. 2B illustrates the orientation of a liquid crystal molecule in accordance with the related art in-plane switching mode LCD device when a voltage is applied to the LCD device.
Figure 3:
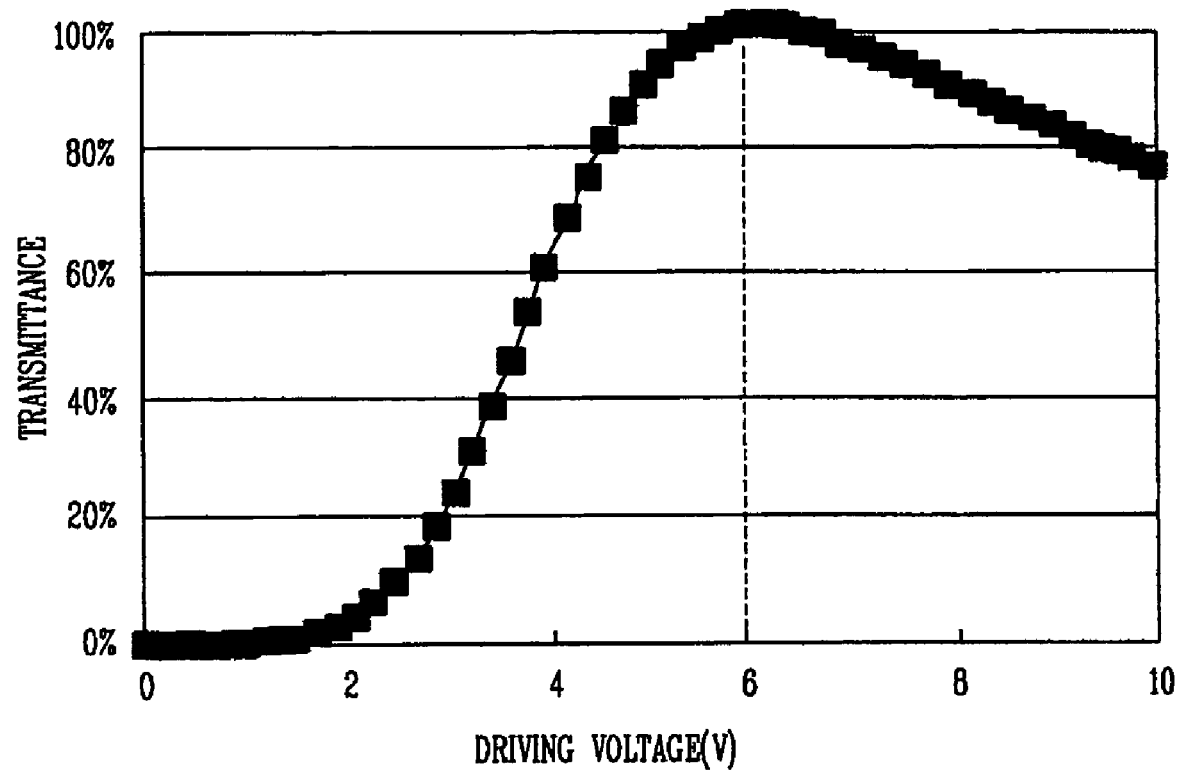
FIG. 3 is a graph showing variations of the light transmittance characteristics of the related art in-plane switching mode LCD device.
Figure 6:
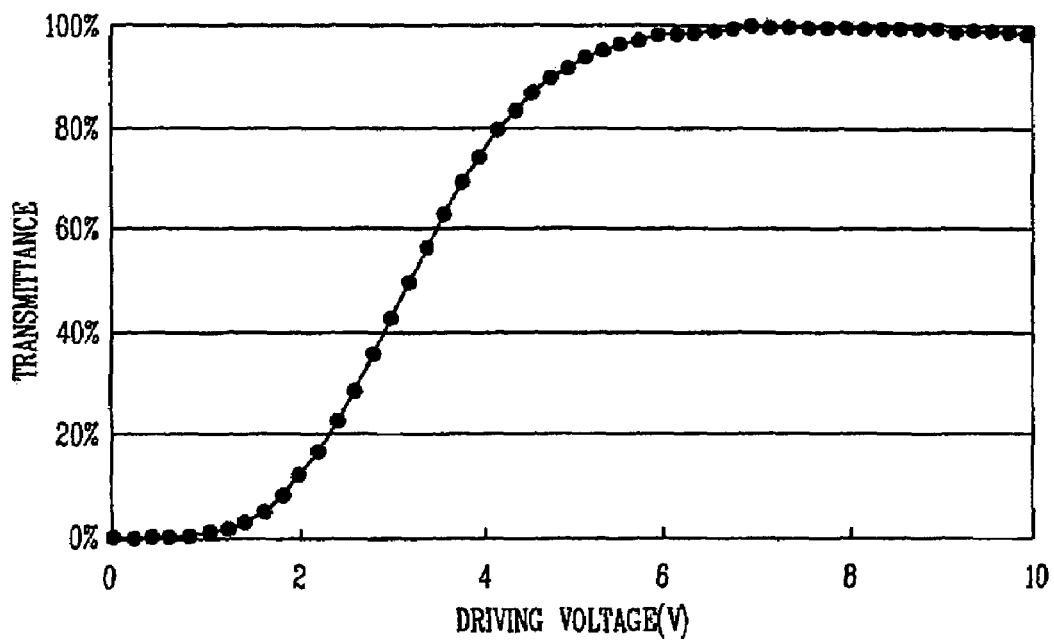
FIG. 6 is a graph showing variations of light transmittance characteristics of an exemplary in-plane switching mode LCD device in accordance with an embodiment of the present invention.

FIG. 6 is a graph showing variations of light transmittance characteristics of an exemplary in-plane switching mode LCD device in accordance with an embodiment of the present invention. As shown in FIG. 6, when no voltage is applied, light transmittance is 0. Light transmittance increases almost linearly with the strength of the applied voltage. When the voltage reaches a certain level, which corresponds to a maximum transmittance, light transmittance is not further increased even if the applied voltage is further increased. When the voltage increases further, the transmittance remains at the maximum value rather than decreasing, in contrast with as the related art behavior depicted in FIG. 3. The initial voltage at which the maximum transmittance is reached is defined as Vmax.

The exemplary light transmittance characteristic curve depicted in FIG. 6 is due to the structural characteristics of the common electrode and the pixel electrode, in accordance with embodiments of the present invention. In general, the light transmittance (T) can be calculated by Equation 1. In Equation 1, α is an angle between a polarization plate and an optical axis of liquid crystal molecules, 'd' is a cell gap of the liquid crystal display, and λ is a wavelength of light. According to Equation 1, if the polarization plate and the rubbing direction have the same direction, the light transmittance is maximized when the angle between the polarization plate and the optical axis of the liquid crystal molecules is 45°.

$$\text{light transmittance}(T)=\sin^2(2\alpha)\sin^2(\pi d\Delta n(\lambda)/\lambda) \quad \text{Equation 1}$$

Figure 7:
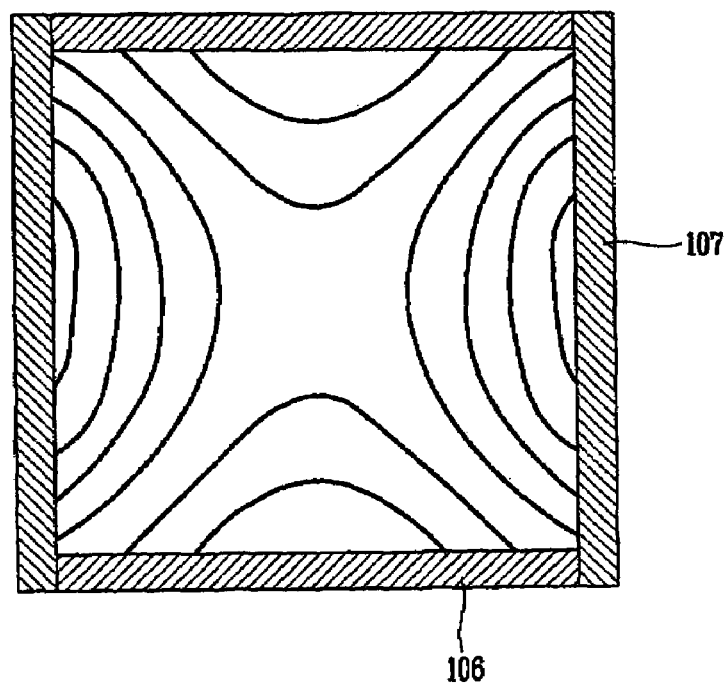
FIG. 7 shows an exemplary equipotential line in a sub-pixel region in accordance with an embodiment of the present invention.

FIG. 7 shows an exemplary equipotential line in a sub-pixel region in accordance with an embodiment of the present invention. As shown in FIG. 7, the direction of the electric field formed between the common electrode and the pixel electrode does not exceed 45°. Accordingly, although the applied voltage may be higher than Vmax, light transmittance is not reduced because the orientation of the liquid crystal molecules 113a does not exceed 45° with respect to the rubbing direction.

Figure 8A:
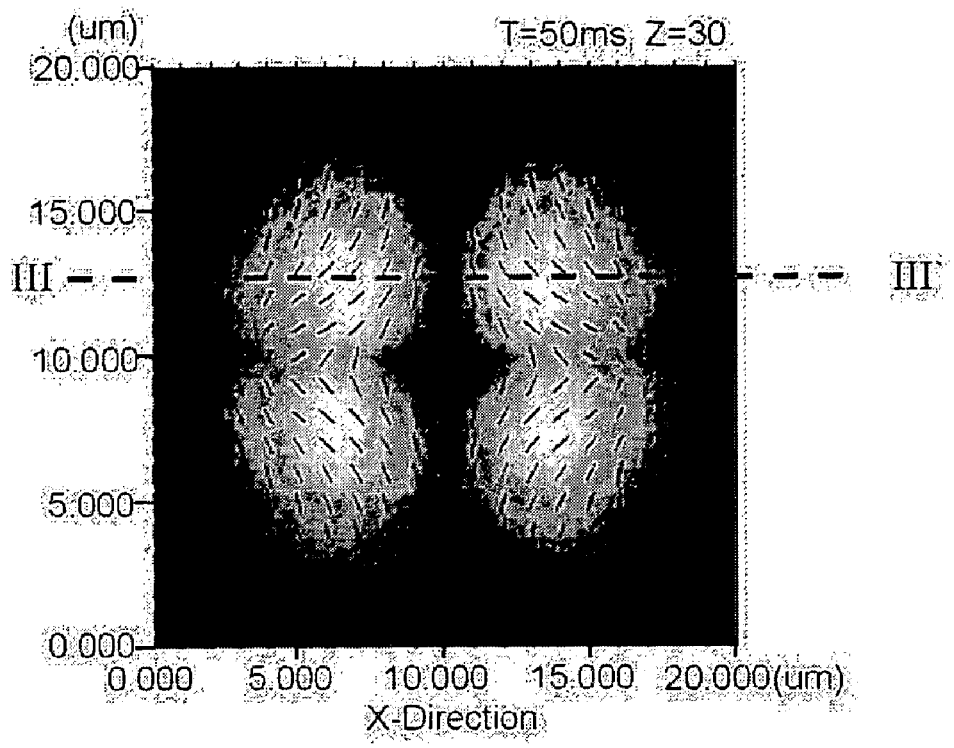
FIG. 8A is a planar view of orientations of liquid crystal. molecules and front surface transmittance characteristics within a sub-pixel region in an exemplary in-plane switching mode LCD device in accordance with an embodiment of the present invention.
Figure 8B:
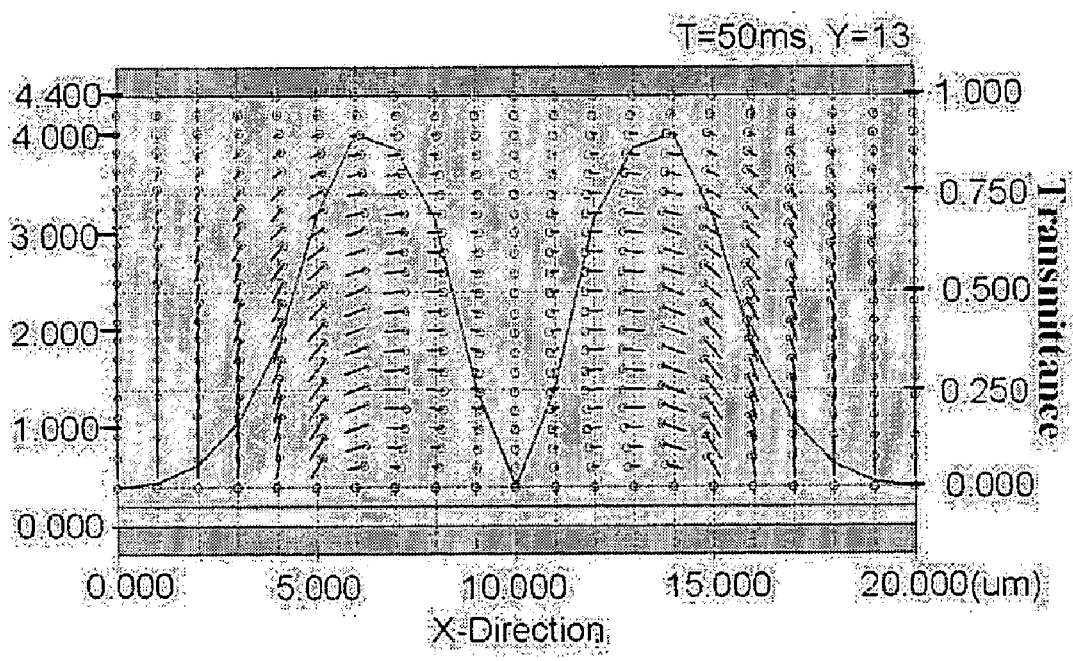
FIG. 8B is a cross-sectional view of the orientations of liquid crystal molecules and transmittance characteristics along line III—III' in the exemplary in-plane switching mode LCD device depicted in FIG. 8A.

FIG. 8A is a planar view of orientations of liquid crystal molecules and front surface transmittance characteristics within a sub-pixel region in an exemplary in-plane switching mode LCD device in accordance with an embodiment of the present invention. FIG. 8B is a cross-sectional view of the orientations of liquid crystal molecules and transmittance characteristics along line III–III' in the exemplary in-plane switching mode LCD device depicted in FIG. 8A. Referring to FIG. 8A, when a voltage Vmax is applied across the common electrode and the pixel electrode, liquid crystal molecules (indicated by a bar shape) are arranged parallel to the field generated between the common electrode and the pixel electrode, and transmit light. Then, a boundary is formed between regions having different states of arrangement of the liquid crystal molecules. The boundary is roughly shaped like a cross (+). The boundary divides one sub-pixel into four domains. Liquid crystal molecules have the same orientation in a diagonal direction. The orientations of liquid crystal molecules are symmetrical about the boundary. In accordance with this embodiment of the present invention, maximum light transmittance is achieved by driving the liquid crystal within the four domains defined by the boundary.

Figure 9:
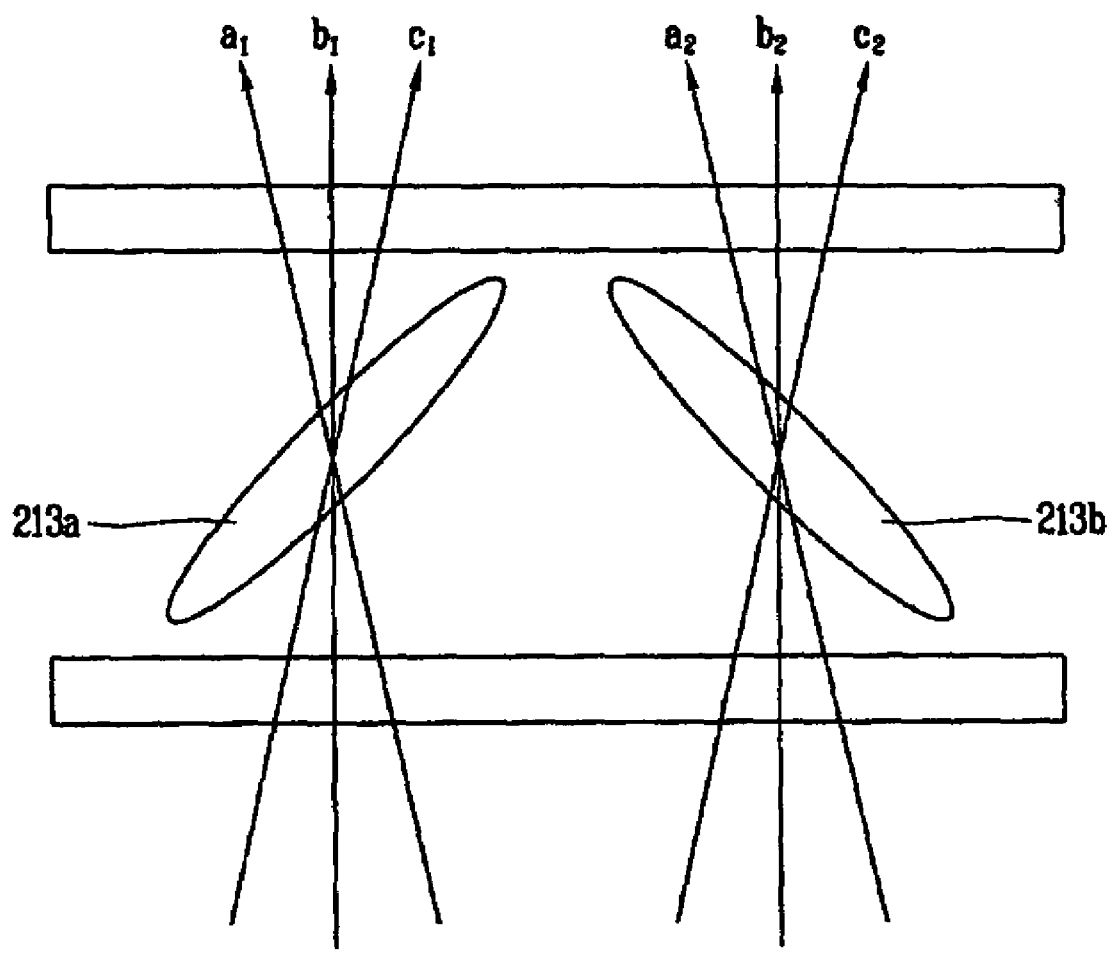
FIG. 9 illustrates a birefringence compensation in an exemplary in-plane switching mode LCD device in accordance with an embodiment of the present invention.

FIG. 9 illustrates a birefringence compensation in an exemplary in-plane switching mode LCD device in accordance with an embodiment of the present invention. As shown in FIG. 9, when liquid crystal molecules are symmetrically oriented in two domains, a birefringence a1 of a first liquid crystal molecule 213a compensates a birefringence a2 of a second liquid crystal molecule 213b oriented in a direction opposite the first liquid crystal molecule 213a, thereby canceling birefringence. Similarly, a birefringence value c1 is compensated by c2. Accordingly, color shift due to the birefringence characteristics of the liquid crystal is minimized. Thus, degradation of image quality according to viewing angle can be prevented. Thus, the symmetrical multi-domain structure compensates aberrations caused by a birefringence of the liquid crystal and minimizes color shift.

Figure 10A:
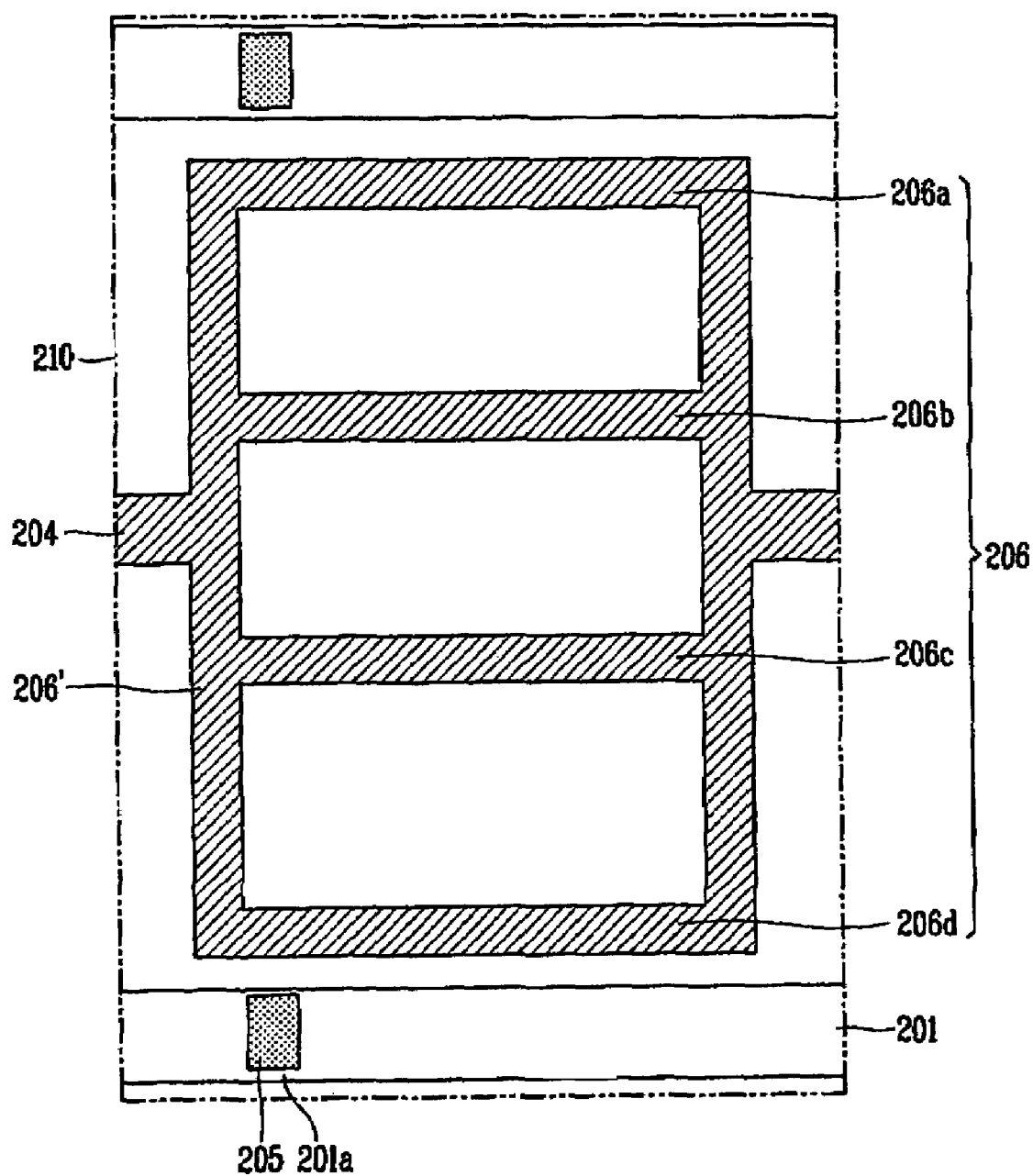
FIGS. 10A and 10B illustrate an exemplary sequential process for fabricating an in-plane switching mode LCD device in accordance with an embodiment of the present invention.
Figure 10B:
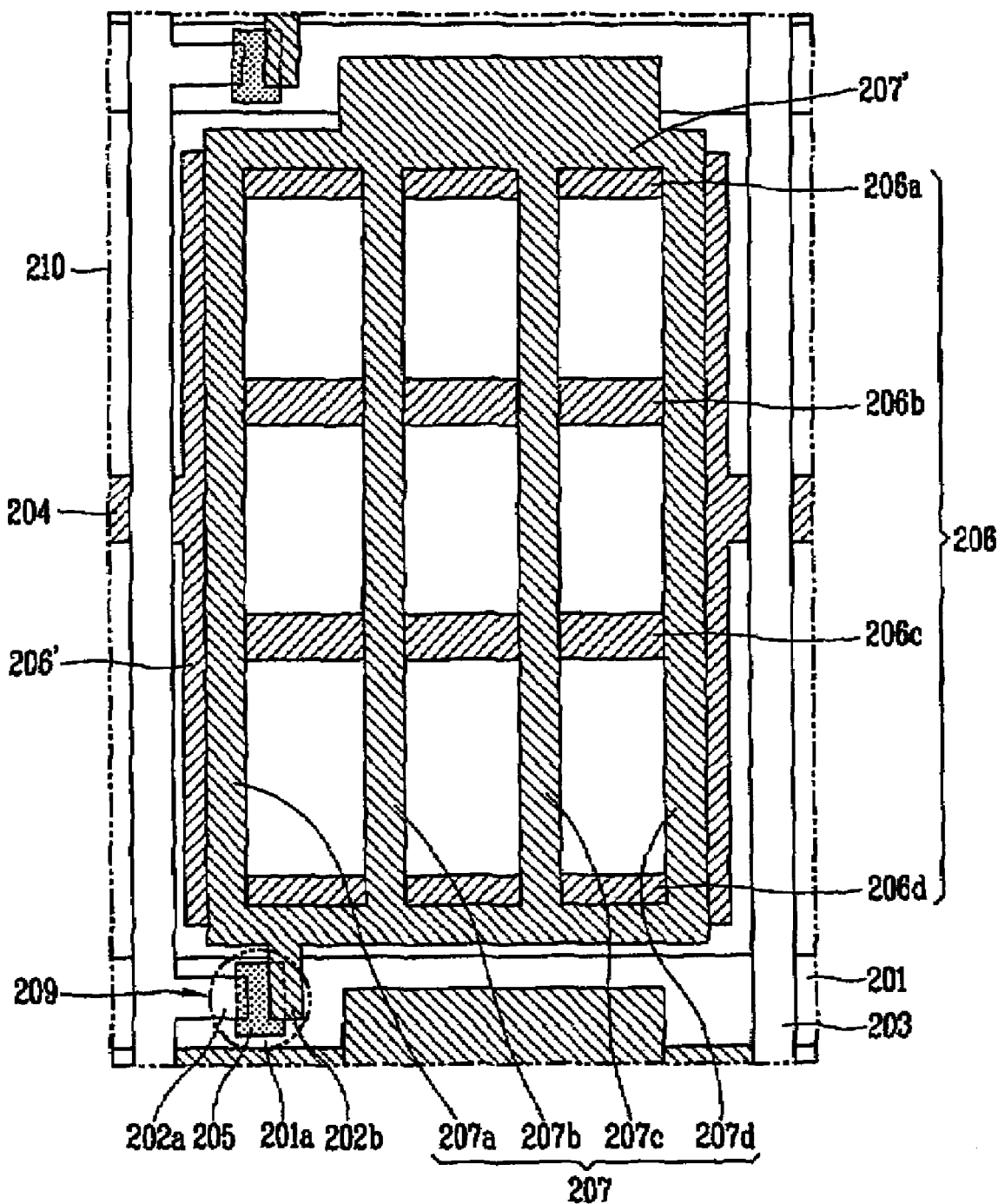

FIGS. 10A and 10B illustrate an exemplary sequential process for fabricating an in-plane switching mode LCD device in accordance with an embodiment of the present invention. As shown in FIG. 10A, a transparent insulation substrate 210, such as glass, is prepared. A metal, such as Cu, Ti, Cr, Al, Mo, Ta or Al, or the like, is deposited on the transparent substrate 210 through a sputtering method, for example. Then, the deposited metal is patterned to form a gate line including a gate electrode 201a, a plurality of common electrodes 206a–206d, a common electrode auxiliary line 206', and a common electrode pattern 204. The plurality of common electrodes 206a–206d are disposed parallel to the gate line 201. The common electrode auxiliary line 206' is vertically disposed at both ends of the common electrodes 206a–206d and electrically connects the common electrodes 206a–206d. The common electrode pattern 204 electrically connects common electrodes of neighboring pixels (not shown) through the common electrode auxiliary line 206'.

Subsequently, an inorganic substance, such as SiNx or SiOx, is deposited on the entire surface of the substrate, including the gate line 201 and the common electrodes 206a–206d, through a plasma CVD method, for example, to form a gate insulation layer (not shown). An amorphous silicon and n+ amorphous silicon are stacked at an upper portion of the gate insulation layer (not shown), and then patterned to form a semiconductor layer 205 at an upper portion of the gate electrode 201a.

Thereafter, as shown in FIG. 10B, a metal, such as a Cu, Mo, Ta, Al, Cr, Ti or Al alloy, or the like, is deposited through a sputtering method, for example, and then patterned. A data line 203 is formed vertically crossing the gate line 201 to define a pixel. Source electrode/drain electrode 202a and 202b are positioned on the semiconductor layer 205. A plurality of pixel electrodes 207a–207d are disposed parallel to the data line 203 and vertically crossing the common electrodes 206a–206d to form a plurality of sub-pixels (P') together with the plurality of common electrodes 206a–206d. A pixel electrode auxiliary line 207' is disposed at both ends of the pixel electrodes 207a–207d to electrically connect the pixel electrodes 207. The pixel electrode auxiliary line 207' positioned at an upper end of the pixel overlaps the gate line 201. The pixel electrode auxiliary line 207' positioned at a lower end is electrically connected to the drain electrode 202b.

Through the above-described process, a thin film transistor 209 is formed to include the gate electrode 201, the semiconductor layer 205 and the source/drain electrodes 202a/202b. The thin film transistor 209 is formed on the gate line 201 at a crossing of the gate line 201 and the data line 203. Then, an inorganic substance, such as SiNx, SiOx, or the like, or an organic substance, such as benzocyclobutene, acryl, or the like, is formed on the entire surface of the substrate including the thin film transistor 209 and the pixel electrode 207, to form a passivation film (not shown). Although not shown, a second substrate with a black matrix and a color filter formed thereon is prepared. The first substrate fabricated through the above-described process is attached to the second substrate, thereby fabricating an in-plane switching mode LCD device.

The in-plane switching mode liquid crystal display device in accordance with embodiments of the present invention provides many advantages. For example, the maximum luminance can be sustained even at higher levels of applied voltage Vmax. In embodiments of the present invention, the maximum applied voltage Vmax can be set higher than a theoretical value, while maintaining the maximum luminance. In addition, the color shift phenomenon can be minimized by forming sub-pixels having four domains per pixel by a suitable horizontal and vertical arrangement of the common electrode and the pixel electrode. Thus, the image quality can be improved in accordance with the reduction in the color shift.

It will be apparent to those skilled in the art that various modifications and variations can be made in the in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode LCD device comprising:
   a first substrate;
   one or more gate line arranged in a first direction on the first substrate;
   one or more data line arranged in a second direction perpendicular to the first direction on the first substrate, a crossing of the one or more data line with the one or more gate line defining a pixel region;
   a common electrode module disposed in the pixel region;
   a pixel electrode module disposed in the pixel region, overlapping the common electrode module;
   a second substrate facing the first substrate;
   a first alignment film and a second alignment film disposed at facing surfaces of the first and second substrates, respectively; and
   a liquid crystal layer between the first alignment film and the second alignment film,
   wherein the common electrode module includes a plurality of common electrodes arranged parallel to the one or more gate line, a left common electrode auxiliary line disposed at an outer left edge of the pixel region, and a right common electrode auxiliary line disposed at an outer right edge of the pixel region, the left and the right common electrode auxiliary lines connecting the plurality of common electrodes, and
   wherein the pixel electrode module includes a plurality of pixel electrodes arranged parallel to the one or more data line, and an upper pixel electrode auxiliary line disposed at an upper most end of the pixel region and connecting the pixel electrodes, the plurality of pixel electrodes crossing the plurality of common electrodes to define a plurality of sub-pixel regions.

2. The device of claim 1, wherein one of the left common electrode auxiliary line and the right common electrode auxiliary line is disposed closer to the one or more data line than to the plurality of pixel electrodes, thereby shielding the plurality of pixel electrodes from a signal on the one or more data line.

3. The device of claim 2, wherein the common electrode auxiliary line does not generate an electric field in the plurality of sub-pixel regions.

4. The device of claim 1, wherein the left common electrode auxiliary line and the right common electrode auxiliary line are parallel to the one or more data line.

5. The device of claim 1, further comprising a common electrode connection pattern electrically connecting the common electrode module to an adjacent common electrode module.

6. The device of claim 5, wherein the common electrode connection pattern is disposed at a central portion of one of the left common electrode auxiliary line and the right common electrode auxiliary line.

7. The device of claim 1, further comprising a lower pixel electrode auxiliary line disposed at a lower end of the pixel region and connecting the plurality of pixel electrodes.

8. The device of claim 7, further comprising a first storage capacitor formed at a region where the upper pixel electrode auxiliary line overlaps the gate line.

9. The device of claim 7, further comprising a second storage capacitor including one of the upper pixel electrode auxiliary line and the lower pixel electrode auxiliary line, and an overlapped portion of one of the plurality of common electrodes.

10. The device of claim 1, further comprising a third storage capacitor including one of the left common electrode auxiliary line and the right common electrode auxiliary line, and an overlapped portion of one of the plurality of pixel electrodes.

11. The device of claim 1, further comprising a fourth storage capacitor formed at a region where the pixel electrode module overlaps the common electrode module.

12. The device of claim 1, further comprising:
a switching device at a crossing of the one or more gate line and the one or more data line.

13. The device of claim 12, wherein the switching device comprises:
a gate electrode connected to the one or more gate line;
a gate insulation layer on the gate electrode;
a semiconductor layer on the gate insulation layer; and
a source and a drain electrodes on the semiconductor layer.

14. The device of claim 1, wherein the second substrate includes a color filter and a black matrix.

15. The device of claim 1, wherein a rubbing direction of the first alignment film is the same as the direction of the one or more gate line.

16. The device of claim 1, wherein a rubbing direction of the first alignment film is the same as the direction of the one or more data line.

17. An in-plane switching mode LCD device comprising:
a first substrate;
one or more gate line arranged horizontally on the first substrate;
one or more data line arranged vertically on the first substrate, and a crossing of the one or more data line with the one or more gate line defining a pixel region;
a common electrode module disposed in the pixel region;
a pixel electrode module disposed in the pixel region, overlapping the common electrode module;
a second substrate facing the first substrate;
a first alignment film and a second alignment film disposed at facing surfaces of the first and second substrates, respectively; and
a liquid crystal layer between the first alignment film and the second alignment film,
wherein the common electrode module includes a plurality of common electrodes arranged parallel to the one or more gate line, a left common electrode auxiliary line disposed at an outer left edge of the pixel region, and a right common electrode auxiliary line disposed at an outer right edge of the pixel region, the left and the right common electrode auxiliary lines connecting the plurality of common electrodes, and
wherein the pixel electrode module includes a plurality of pixel electrodes arranged parallel to the one or more data line, an upper pixel electrode auxiliary line disposed at an upper most end of the pixel region, a lower pixel electrode auxiliary line disposed at a lower most end of the pixel region, each of the upper and lower pixel electrode auxiliary lines connecting respective upper and lower ends of the plurality of pixel electrodes, the plurality of pixel electrodes crossing the plurality of common electrodes to define a plurality of sub-pixel regions.

18. A method for fabricating an in-plane switching mode LCD device comprising:
providing a first substrate and a second substrate facing each other;
forming one or more horizontal gate line on the first substrate; forming one or more vertical data line on the first substrate, a crossing of the one or more data line with the one or more gate line defining a pixel region;
forming a common electrode module disposed in the pixel region by forming a plurality of common electrodes arranged parallel to the one or more gate line, disposing a left common electrode auxiliary line at an outer left edge of the pixel region, and disposing a right common electrode auxiliary line at an outer right edge of the pixel region, the left and the right common electrode auxiliary lines connecting the plurality of common electrodes;
forming a pixel electrode module disposed in the pixel region, overlapping the common electrode module by forming a plurality of pixel electrodes arranged parallel to the one or more data line, disposing an upper pixel electrode auxiliary line at an upper most end of the pixel region, disposing a lower pixel electrode auxiliary line at a lower most end of the pixel region, each of the upper and lower pixel electrode auxiliary lines connecting respective upper and lower ends of the plurality of pixel electrodes, the plurality of pixel electrodes crossing the plurality of common electrodes to define a plurality of sub-pixel regions;
forming a first alignment film and a second alignment film at facing surfaces of the first and second substrates, respectively; and
forming a liquid crystal layer between the first alignment film and the second alignment film.

19. The method of claim 18, further comprising:
forming an insulation layer between the common electrode module and the pixel electrode module.

20. The method of claim 18, further comprising:
forming a color filter and a black matrix on the second substrate.

21. The device of claim 1, wherein the upper pixel electrode auxiliary line overlaps a portion of the gate line.

22. The device of claim 13, wherein the lower pixel electrode auxiliary is electrically connected to the drain electrode of the switching device.

23. The device of claim 17, wherein the upper pixel electrode auxiliary line overlaps a portion of the gate line.

24. The device of claim 17, further comprising:
a switching device at a crossing of the one or more gate line and the one or more data line.

25. The device of claim 24, wherein the switching device comprises:
   a gate electrode connected to the one or more gate line;
   a gate insulation layer on the gate electrode;
   a semiconductor layer on the gate insulation layer; and
   a source and a drain electrodes on the semiconductor layer.

26. The device of claim 25, wherein the lower pixel electrode auxiliary is electrically connected to the drain electrode of the switching device.

27. The device of claim 18, wherein the upper pixel electrode auxiliary line overlaps a portion of the gate line.

28. The device of claim 18, further comprising:
   a switching device at a crossing of the one or more gate line and the one or more data line.

29. The device of claim 28, wherein the switching device comprises:
   a gate electrode connected to the one or more gate line;
   a gate insulation layer on the gate electrode;
   a semiconductor layer on the gate insulation layer; and
   a source and a drain electrodes on the semiconductor layer.

30. The device of claim 29, wherein the lower pixel electrode auxiliary is electrically connected to the drain electrode of the switching device.

* * * * *